T. E. MURRAY.
METHOD OF UNITING METAL PLATES.
APPLICATION FILED AUG. 4, 1920.

1,363,161.

Patented Dec. 21, 1920.

Inventor
Thomas E. Murray
By his Attorney
Park Benjamin

UNITED STATES PATENT OFFICE.

THOMAS E. MURRAY, OF BROOKLYN, NEW YORK.

METHOD OF UNITING METAL PLATES.

1,363,161.    Specification of Letters Patent.    Patented Dec. 21, 1920.

Application filed August 4, 1920. Serial No. 401,147.

*To all whom it may concern:*

Be it known that I, THOMAS E. MURRAY, a citizen of the United States, residing at Brooklyn, in the county of Kings and State of New York, have invented a certain new and useful Improvement in Methods of Uniting Metal Plates, of which the following is a specification.

The invention is a method of uniting the edges of metal plates, and comprises the several steps hereinafter pointed out, whereby portions of said edges are electrically welded and the intervening unwelded space or spaces between said welded portions are sealed.

In the accompanying drawing—

Figure 1:
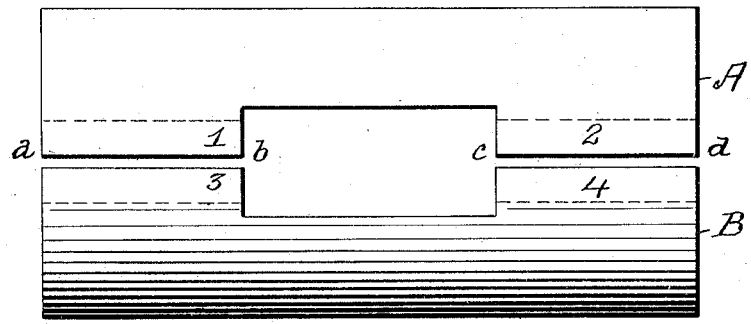
Figure 2:
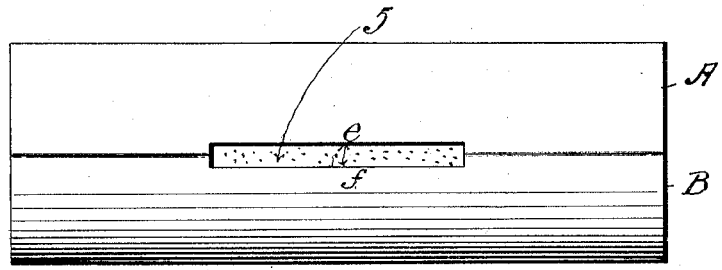
Figure 3:
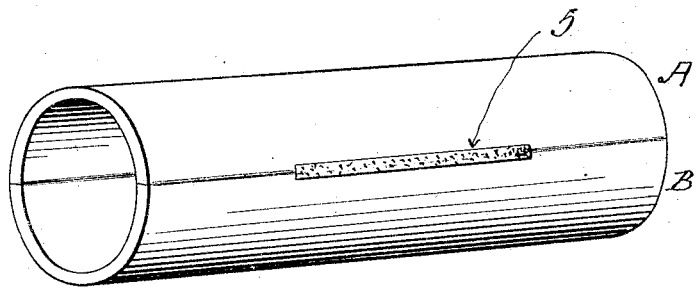
Figure 4:
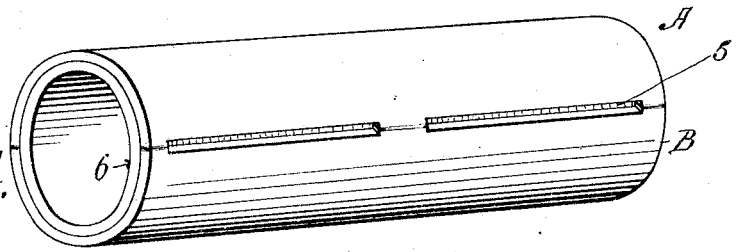

Figure 1 shows two semicylindrical plates having projections on their edges disposed with the projections opposite one another prior to welding. Fig. 2 shows said plates after welding. Fig. 3 is a perspective view of the tube of Fig. 2. Fig. 4 is a perspective view of the tube as in Fig. 3, but having three projections and inclosing another tube.

Similar letters and numbers of reference indicate like parts.

When two elongated plates are to be electrically welded together at their edges, difficulties in making the weld everywhere uniform are encountered, which become greater as the length of the joint increases. Cases, however, occur in which the structure into which the plates enter, while requiring that there shall be a complete closure at the joint, does not require that said joint in order to be sufficiently strong must be continuous from end to end of the plates. My method deals with this condition.

Referring first to Figs. 1 and 2, A and B are two elongated semicylindrical metal plates to be united. On plate A, I form two projections 1, 2, and on plate B two similar projections 3, 4. The aggregate length $a$, $b$ and $c$, $d$ of these projections is to be such that the welded joints made between them will be strong enough to resist whatever strain to which it may be designed to subject them. The plates are disposed in the welding machine with the projections on one plate opposite those on the other plate, and the current being established, the projections are pressed together until they become electrically welded. Between the projections there will then remain an unwelded space, the width $e$, $f$ of which will depend upon the take-up of the projections due to aforesaid pressure. In practice it is preferable so to regulate the amount of take-up that the metal at and immediately adjacent to the contacting surfaces of the projections, which may be more or less oxidized while heated by the current, will be squeezed out of the joint and into the extruded rib or fin. Thus, in Fig. 2 the amount of take-up is that shown by the distance between the dotted lines in Fig. 1 and the edges of the projections. I then remove the welded plates from the welding machine and introduce into the unwelded space between the projections any suitable material 5 to seal said space. Preferably, I accomplish this by electric arc fusion, either depositing in the space metal from a fusible pencil electrode, or with a non-fusible electrode melting the metal of one plate or both plates and allowing the same to flow into said space.

If the tube of Figs. 2 and 3 is to resist internal pressure, this pressure will be considered in determining the welding areas of the projections to give the tube the necessary strength.

Instead of sealing the unwelded spaces by introducing a filling material, I may do so by inserting between the sections of the tube, an inner tube 6, Fig. 4. This is preferably done before said sections are welded, so that the extruded metal on the inner periphery of the outer tube will run between the tubes and bind them together. The inner tube then seals the unwelded space between the projections. Of course, if desired, said space may in addition, receive the filling 5 to render uniform the outer periphery of the inclosing tube.

I claim:

1. The method of uniting two plates at their edges, which consists in electrically welding together portions of said edges, and then sealing the unwelded space between said welded portions.

2. The method of uniting two plates at their edges, which consists in electrically welding together portions of said edges, and then introducing a filling into the unwelded space between said welded portions.

3. The method of uniting two plates at their edges, which consists in electrically welding together portions of said edges, and then fusing metal and introducing the same into the unwelded space between said welded portions.

4. The method of uniting two plates at their edges, which consists in electrically welding together portions of said edges of said plates, and then fusing a portion of the metal of said plates and introducing the same into the unwelded space between said welded portions.

5. The method of uniting two plates, which consists in forming projections upon the edges of said plates, electrically welding said projections together, and then filling the unwelded space between said welded projections with fused metal.

6. The method of uniting the longitudinal sections of a tube, which consists in electrically welding together said sections edge to edge along portions of their lengths while inclosing an inner tube disposed to cover the unwelded spaces between said welded portions.

7. The method set forth in claim 6, including the further step of filling the unwelded spaces covered by said inner tube.

In testimony whereof I have affixed my signature in presence of two witnesses.

THOMAS E. MURRAY.

Witnesses:
GERTRUDE T. PORTER,
MAY T. MCGARRY.